United States Patent
Marchesi (10) Patent No.: US 7,937,989 B2
(45) Date of Patent: May 10, 2011

(54) DEVICE FOR DETECTING A VARIABLE FOR A PROCESS FLUID VIA DIFFERENTIAL MEASUREMENT

(75) Inventor: Rossano Marchesi, Dongo (IT)

(73) Assignee: ABB S.p.A., Milan (IT)

( * ) Notice: Subject to any disclaimer, the term of this patent is extended or adjusted under 35 U.S.C. 154(b) by 556 days.

(21) Appl. No.: 11/852,101

(22) Filed: Sep. 7, 2007

(65) Prior Publication Data

US 2008/0060410 A1 Mar. 13, 2008

(30) Foreign Application Priority Data

Sep. 8, 2006 (IT) .............................. MI2006A1722

(51) Int. Cl.
*G01L 13/02* (2006.01)
*G01L 19/00* (2006.01)
*G01L 27/00* (2006.01)

(52) U.S. Cl. ................... 73/53.01; 73/53.04; 73/61.78; 73/299

(58) Field of Classification Search ................. 73/53.01, 73/53.04, 61.78, 299
See application file for complete search history.

(56) References Cited

U.S. PATENT DOCUMENTS

| | | | | |
|---|---|---|---|---|
| 3,656,348 A * | 4/1972 | Bertrand | ......................... | 73/701 |
| 3,999,435 A * | 12/1976 | Siegel | ............................. | 73/708 |
| 4,019,387 A * | 4/1977 | Siegel | ............................. | 73/299 |
| 4,336,825 A * | 6/1982 | Pion | ............................... | 137/403 |
| 4,722,228 A * | 2/1988 | Awa et al. | ........................ | 73/706 |

FOREIGN PATENT DOCUMENTS

| GB | 2359889 | * | 9/2001 |
|---|---|---|---|
| JP | 11-014483 A | * | 1/1999 |
| JP | 11-118645 A | * | 4/1999 |

* cited by examiner

*Primary Examiner* — Daniel S Larkin
(74) *Attorney, Agent, or Firm* — Connolly Bove Lodge & Hutz LLP (57) ABSTRACT

Described herein is a device for detecting a physical variable for a process fluid via differential measurement, comprising a pressure transmitter having a main body, provided with a pressure sensor and a first pressure-sensitive element and a second pressure-sensitive element operatively connected to the pressure sensor. The device moreover comprises a first remote separator, designed to be positioned in a first detection position, and a second remote separator, designed to be positioned in a second detection position.

23 Claims, 7 Drawing Sheets

DEVICE FOR DETECTING A VARIABLE FOR A PROCESS FLUID VIA DIFFERENTIAL MEASUREMENT

RELATED APPLICATIONS

This application claims priority to Italian Application No. MI2006A001722 filed Sep. 8, 2006, disclosure of which is incorporated herein by reference.

BACKGROUND OF THE INVENTION

The present invention relates to a device for detecting a physical variable for a process fluid via differential measurement.

It is known that, in systems for controlling industrial processes, for the purpose of detecting/measuring one or more physical variables of a process fluid, for example, absolute, relative or differential pressure, flow rate, level, and the like, purposely designed field devices are widely used.

In one of the most widespread embodiments, said field devices comprise an appropriately configured casing, housed inside which are the various components designed for detection, amongst which typically a pressure sensor (hence the term "pressure transmitters"). The use of a pressure sensor as transduction element in fact enables convenient derivation, by one or more relative, differential or absolute pressure measurements, of measurement values for other physical variables of the process fluid that are being controlled, for example the level, which would otherwise be more difficult to transduce directly. In the casing of the transmitter there are then provided other components, amongst which: primary electronic circuits, which are designed to process the signals coming from the pressure sensor; secondary electronic circuits designed for processing the signals coming from the primary electronic circuits and hence responsible for managing the communication with other transmitters or with the control unit; display units for displaying in loco the variables detected; a terminal board for the various connections; as well as electrical circuits for supply of the components, etc.

To carry out the operations of detection and measurement required, each pressure transmitter is provided with one or more pressure-sensitive elements that interface with the process and are usually designated by the terms of "separator assemblies", or "diaphragms" or "separation membranes", or other equivalent terms.

In particular, differential pressure transmitters are provided with two separator assemblies, each of which comprises a purposely provided elastic element, typically a flexible metal membrane that is fixed on a support, which is also usually made of metal. The separator assembly is positioned on the instrument so that the membrane will have an outer wall exposed to the process fluid and an inner wall coupled hydraulically to the pressure sensor, usually via an incompressible fluid, such as, for example, a silicone oil, contained in a purposely provided capillary connection tube. In this way, the pressure exerted by the fluid on each of the flexible membranes causes deformation thereof and is transferred via the hydraulic-coupling fluid to the pressure sensor. In turn, the sensor "senses" the pressure on the two branches of the instrument and transmits the corresponding signals to the electronics for the various processing operations.

In some conditions of application, such as, for example, for measuring the level of a fluid contained within a tank, it is necessary to carry out the measurements in a position that is remote with respect to the instrument and/or in two different positions of the process, which may even be at considerable distances apart from one another and from the body of the transmitter itself. In this case, the differential pressure transmitter is equipped with purposely designed remote separators. Said remote separators also comprise similar pressure-sensitive elements, typically an elastic membrane appropriately fixed on a supporting separator body. A purposely provided capillary tube, filled with transduction or transmission fluid, preferably an incompressible silicone oil, sets the elastic membrane of the remote separator in direct hydraulic communication with the elastic membrane housed directly on the main body of the instrument.

In said applications, any detection made may be subject to errors determined by differences of temperature of the process in which the transmitter is inserted, as well as by differences of ambient temperatures, and in particular differences of temperature that can be encountered throughout the structure of the two measurement branches constituted by the main body of the instrument, the two, remote separators, and the surrounding parts.

Consequently, the main purpose of the present invention is to provide a device for detecting a physical variable for a process fluid that will enable a sensible reduction of the errors of measurement caused by differences of process and ambient temperatures between the two branches of the instrumentation for detection and the surrounding parts.

This purpose is achieved by a device for detecting a physical variable for a process fluid according to what is specified in the claims.

BRIEF DESCRIPTION OF THE DRAWINGS

Further characteristics and advantages of the invention will emerge more clearly from the description of preferred, but non-exclusive, embodiments of the device according to the invention, illustrated by way of indicative and non-limiting example in the attached drawings, wherein.

DETAILED DESCRIPTION OF PREFERRED EMBODIMENTS

In the ensuing description, elements that are the same or technically equivalent to one another will be designated with the same reference numbers.

Figure 2:
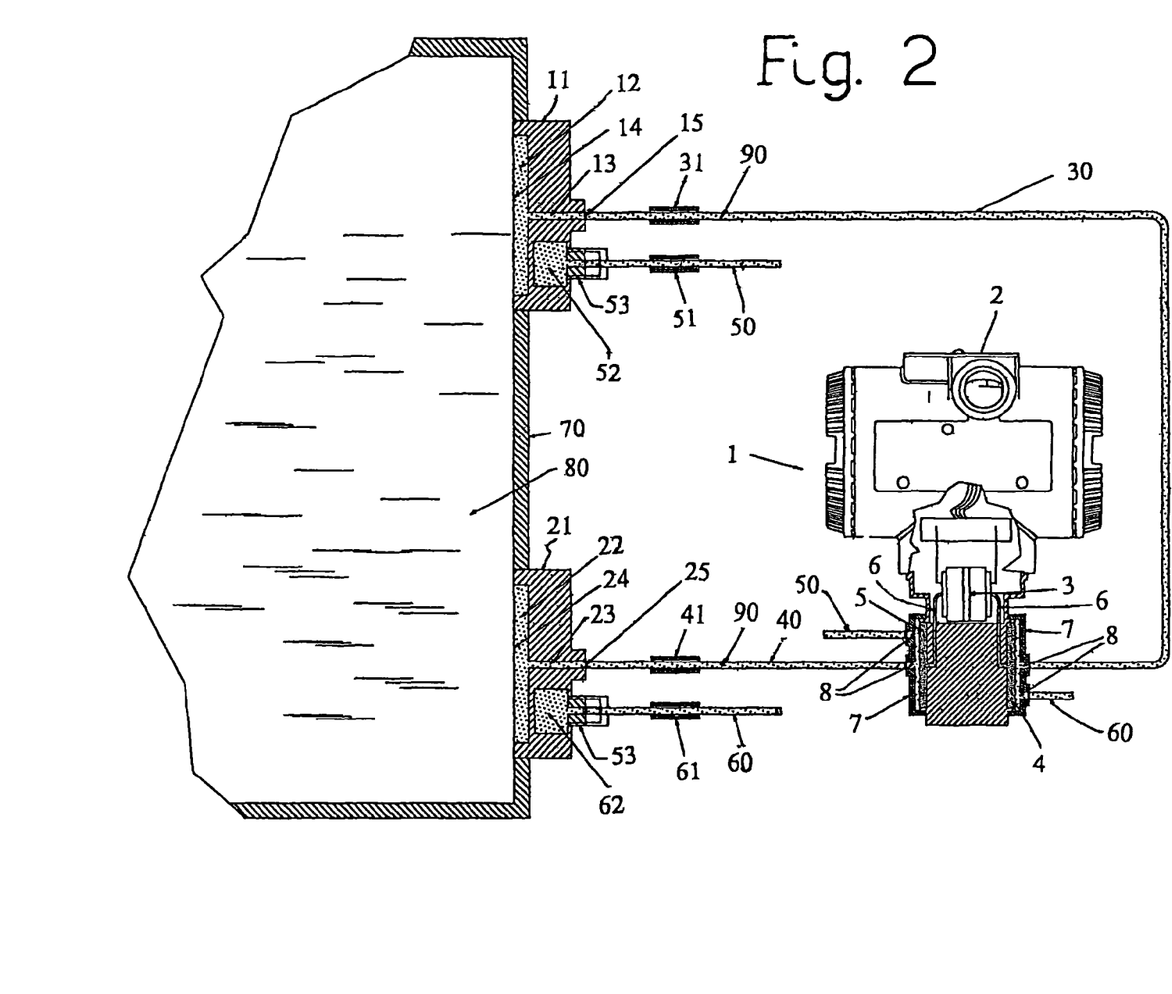
FIG. 2 is a partially cross-sectional side view, illustrating schematically and not in scale the device according to the present invention, with some components enlarged for reasons of greater clarity of illustration.
Figure 3:
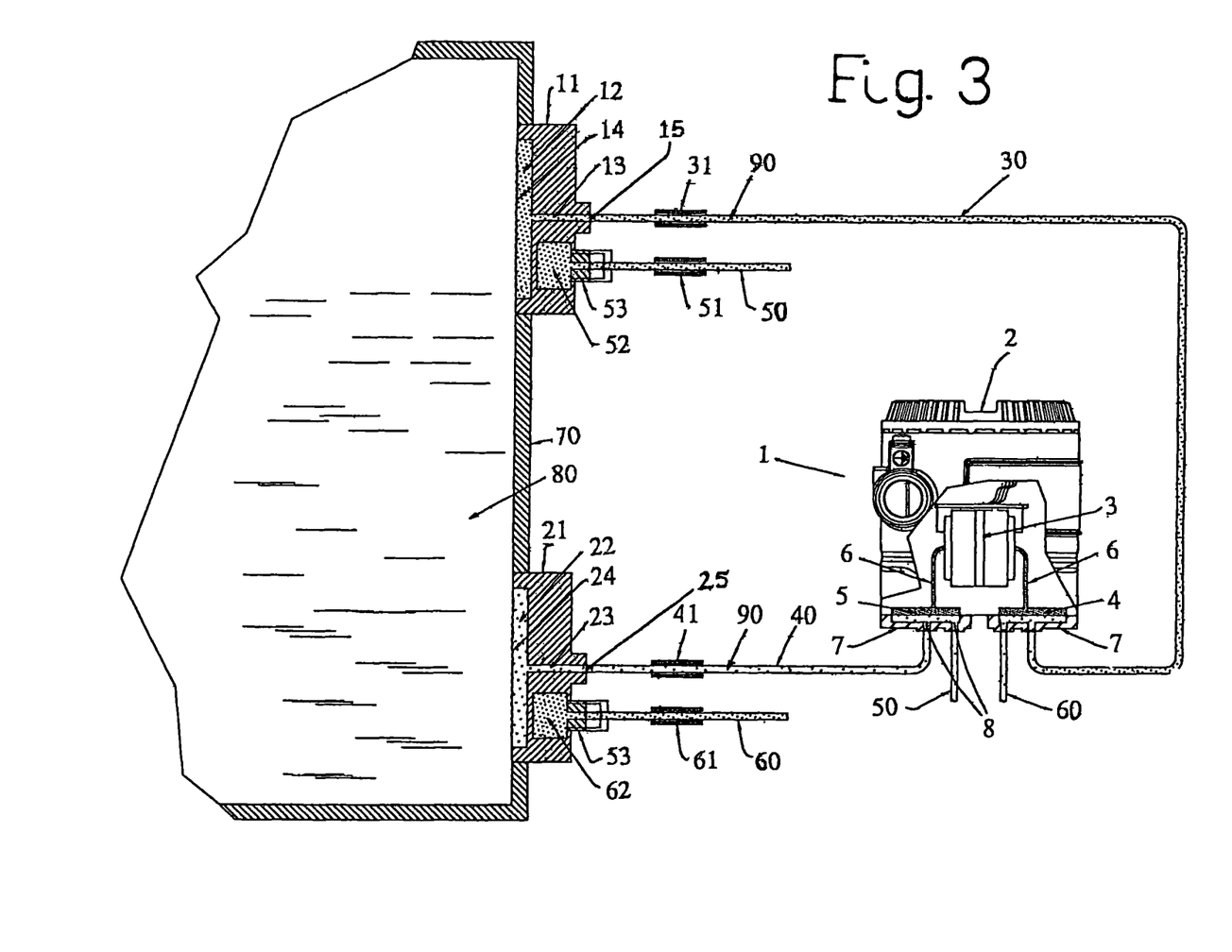
FIG. 3 illustrates the device of FIG. 2, which uses a pressure transmitter of a coplanar type.

With reference to the above figures, the device for detecting a physical variable for a process fluid of an industrial plant according to the present invention, designated as a whole by the reference number 100, comprises: a pressure transmitter 1 having a main body 2 provided with a pressure sensor 3; a first pressure-sensitive element 4; and a second pressure-sensitive element 5. According to embodiments that are widely known and hence not described in detail herein, the two pressure-sensitive elements 4 and 5, which can be referred to in practice as "membranes" or "separation diaphragms", or other equivalent terms, are generally constituted by two corresponding flexible membranes or laminas, for example, appropriately treated metal laminas. Said elements 4 and 5 are each fixed on a respective supporting assembly or element, constituted, for example, by a hollow metal block so as to have one face exposed to the action of pressure exerted by a fluid. The two pressure-sensitive elements 4 and 5 are moreover operatively connected to the pressure sensor 3. In particular, an appropriate circuit constituted basically by two capillary tubes 6, filled with a substantially incompressible fluid, for example a silicone oil, provides a hydraulic connection of the two elements 4 and 5 to the pressure sensor 3. Furthermore, the two pressure-sensitive elements 4 and 5 can be arranged in different configurations, for example parallel to one another, as illustrated in FIG. 2, or else coplanar, as illustrated in FIG. 3.

Figure 1:
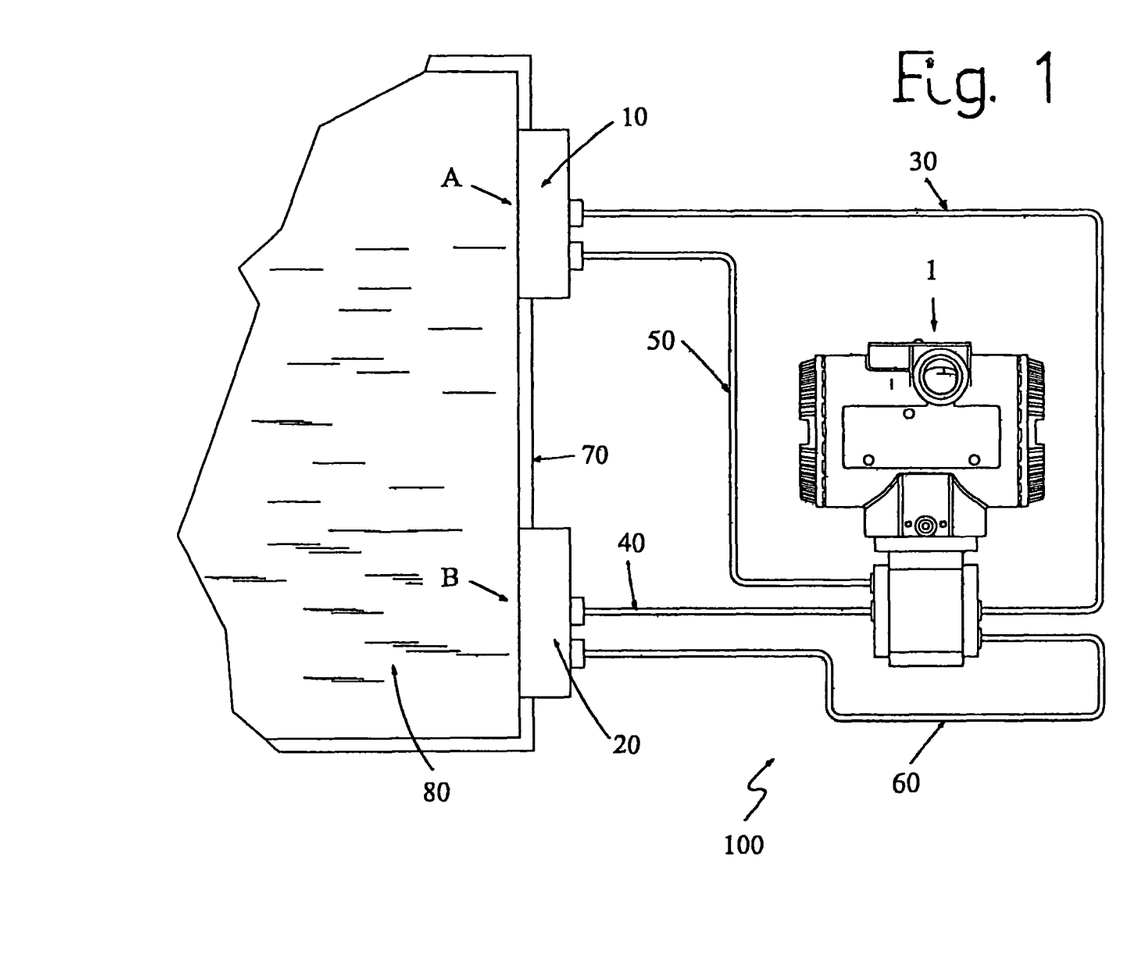
FIG. 1 is a schematic illustration (not in scale) of the device according to the invention, used, for example, in measuring the level of fluid contained in a tank.

The device 100 moreover comprises a first remote separator 10 and a second remote separator 20, which, as illustrated in the example of application of FIG. 1, in the stage of installation of the device are designed to be mounted in two positions of detection that are different from one another, respectively A and B, e.g., along the walls of a tank 70 containing a fluid 80, the level of which is, for example, to be measured. In the embodiments illustrated in FIGS. 2 and 3, the first remote separator 10 comprises: a first supporting body 11, for example, a metal block or disk, provided with at least one first cavity, through which it opens towards the outside of the supporting body itself 11 and is formed by a first portion 12 and a narrower second portion 13, which communicate with one another; and a pressure-sensitive element 14 (hereinafter referred to as "third pressure-sensitive element"), which is fixed on the supporting element 11 so as to have an outer surface designed to interface with the process fluid of which it is desired to detect the variable in the first detection position A, and an inner surface that gives out onto and closes on the outside, on one side, the first cavity 12, 13. In turn, the second remote separator 20 comprises: a first supporting body 21, for example, a metal block or disk, which also has a through cavity (hereinafter referred to as second cavity) open towards the outside of the supporting body itself 21 and formed by two similar portions 22 and 23 communicating with one another; and a pressure-sensitive element 24 (hereinafter referred to as "fourth pressure-sensitive element"), which is fixed on the supporting element 21 so as to have an outer surface designed to interface with the process fluid of which it is desired to detect the variable in the second detection position B, and an inner surface that gives out onto and closes on the outside, on one side, the second cavity 22, 23.

Like the two pressure-sensitive elements 4 and 5, also the third pressure-sensitive element 14 and the fourth pressure-sensitive element 24 can be constituted by a flexible membrane, such as, for example, an appropriately treated metal lamina.

The two remote separators 10 and 20 are operatively connected to the main body 2 of the transmitter 1 through two corresponding containers 30 and 40, such as two flexible tubes, for example, two capillary tubes. In particular, the first container 30 has a first end connected to the first supporting body 11 at the inlet/opening of the second portion 13, and a second end, operatively connected to the first pressure-sensitive element 4. As illustrated schematically in FIG. 2 or FIG. 3, the end of the container 30 is fixed to an interface flange or wall 7 provided with a through channel 8 that sets in communication the first container 30 itself with the pressure-sensitive element 4. The connections between the various components are made so that the body 2 of the transmitter 1, and in particular the first pressure-sensitive element 4 with corresponding walls of the through channel 8, the first container 30, and the first remote separator 10, in particular the first supporting body 11 through the walls of the first cavity 12-13, and the third pressure-sensitive element 14, will delimit as a whole a closed internal environment of total volume $V_{t1}$. Said volume $V_{t1}$ is filled with a substantially incompressible transmission fluid 90, for example a silicone oil, which transmits to the pressure-sensitive element 4 the pressures exerted by the fluid 80 on the pressure-sensitive element 14. In turn, the second container 40 has a first end connected to the second supporting body 21 at the inlet/opening of the portion 23, and a second end, operatively connected to the second pressure-sensitive element 5; the end of the container 40 is fixed to a second interface flange or wall 7, provided with a corresponding through channel 8, which sets in communication the second container 40 itself with the pressure-sensitive element 5. Also in this case, the connections between the various components are made so that the body 2 of the transmitter 1, and in particular the second pressure-sensitive element 5, with corresponding walls of the through channel 8, the second container 40, the second remote separator 20, in particular the second supporting body 21 through the walls of the its cavity 22-23, and the fourth pressure-sensitive element 24 will delimit as a whole a closed internal environment of total volume $V_{t2}$. Also the volume $V_{t2}$ is filled with a substantially incompressible transmission fluid, for example, a silicone oil identical to the fluid 90 for filling the volume $V_{t1}$ which transmits to the pressure-sensitive element 5 the pressures exerted by the fluid 80 on the pressure-sensitive element 24.

Advantageously, the device 100 comprises correction means operatively coupled to the remote separators 10 and 20 and to the two pressure-sensitive elements 4 and 5, said correction means being arranged outside the main body 2 of the pressure transmitter 1 and being configured so as to exert on the first and second pressure-sensitive elements 4 and 5 a corresponding action designed to correct, at least partially, the effect created by differences of temperature existing between the two detection branches, on, or along at least part of the two detection branches, and/or by the environment surrounding them, and/or the process temperature. Said two detection branches are constituted on the one hand, by the ensemble made up by the first remote separator 10, the first container 30, and the pressure transmitter 1, in particular the pressure-sensitive element 4, and, on the other, by the ensemble made up by the second remote separator 20, the second container 40, and the pressure transmitter 1, in particular the pressure-sensitive element 5.

Preferably, the correction means comprise a first closed hydraulic circuit and a second closed hydraulic circuit, which are hydraulically separated from one another, and an end surface of which is delimited, respectively, by the first pressure-sensitive element 4 and by the second pressure-sensitive element 5. Said closed hydraulic circuits are both filled with a substantially incompressible transmission fluid, preferably the same fluid that fills the volumes $V_{t1}$ and $V_{t2}$, respectively.

Preferably, the first closed hydraulic circuit delimits an internal volume comprised between 95% and 105% of the total volume V; according to a particularly preferred embodiment, the first closed hydraulic circuit delimits an internal volume substantially equal to said total volume $V_{t1}$.

In turn, the second closed hydraulic circuit preferably delimits an internal volume comprised between 95% and 105% of the total volume $V_{t2}$; still more preferably, the second closed hydraulic circuit delimits an internal volume substantially equal to the total volume $V_{t2}$.

Figure 5:
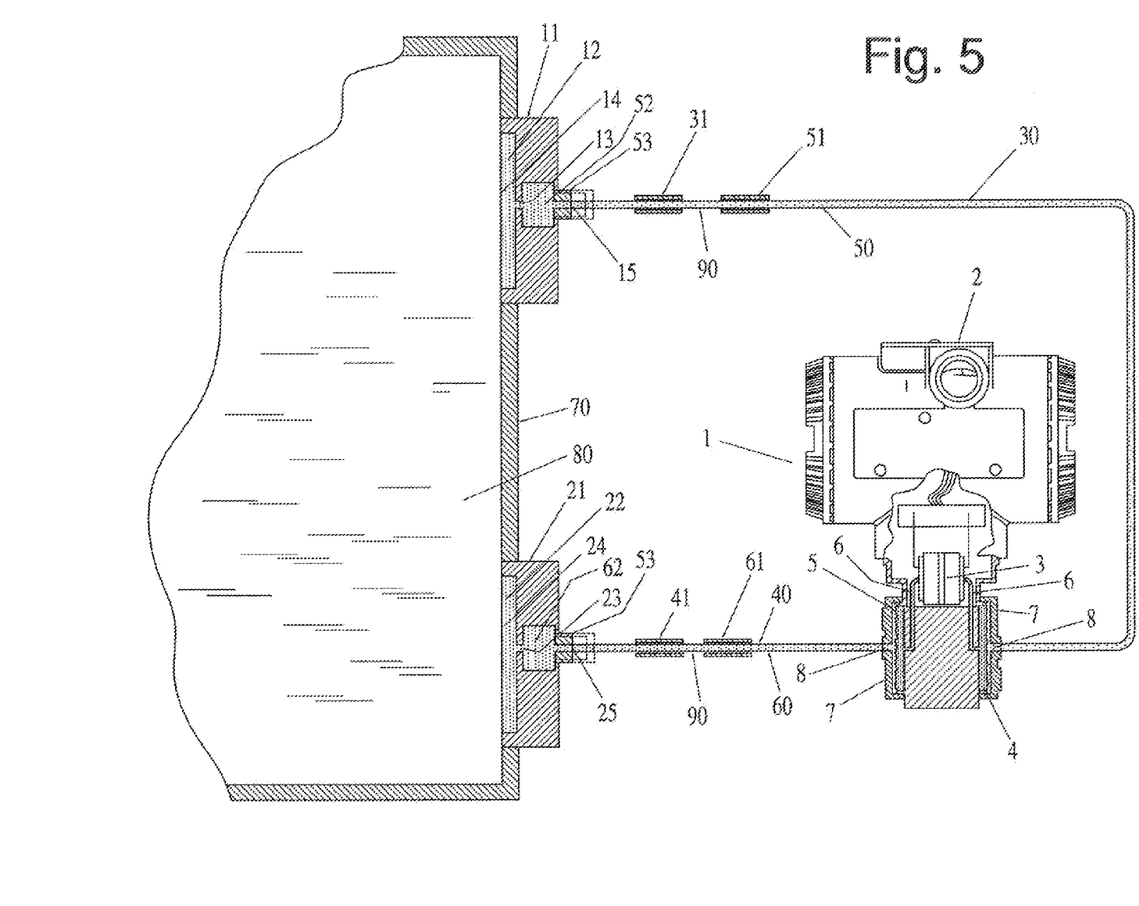
FIG. 5 illustrates another embodiment of the device.
Figure 6:
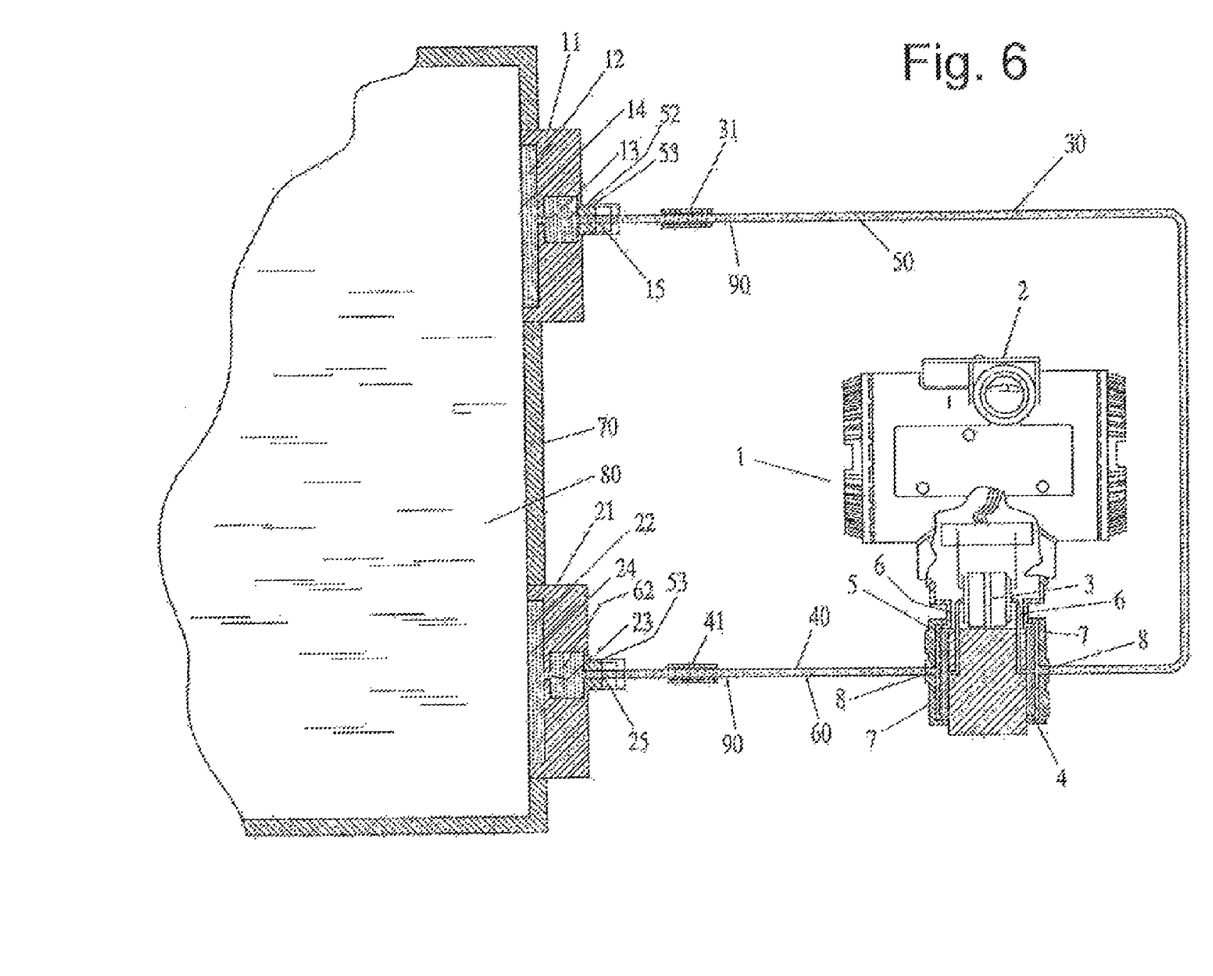
Figure 7:
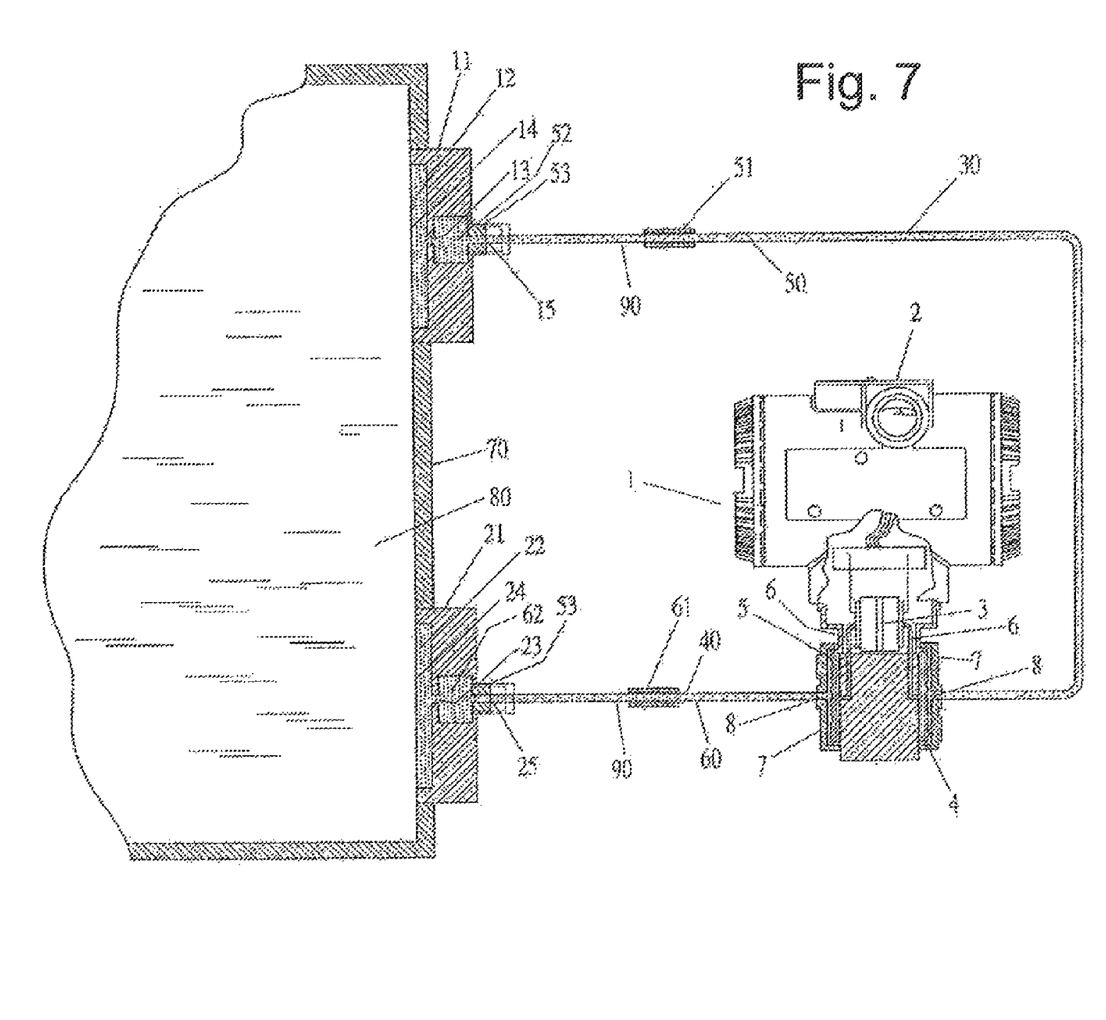

In the embodiment illustrated in the figures, the first closed hydraulic circuit comprises at least one first supplementary container 50, for example a flexible tubular body, such as a capillary tube. The first supplementary container 50 comprises a first end, operatively connected to the first supporting body 11 of the first remote separator 10, on the side opposite to the pressure-sensitive element 14, and a second end, operatively connected to the second pressure-sensitive element 5. As illustrated schematically in FIG. 2 or FIG. 3, the end of the first supplementary container 50 is connected to the interface flange 7 and is set in operative hydraulic communication with the element 5 via a through channel 8. Preferably, the first container 30 and the first supplementary container 50 are made of one and the same material, for example, stainless steel type 316l. Furthermore, as illustrated schematically in FIG. 2 or FIG. 3, the two containers 30 and 50 can be housed in two respective sheaths 31 and 51 having the same thickness and being made of the same material, for example, stainless steel of the series 300 with or without outer coating made of PVC; preferably, the two containers 30 and 50 are housed in a single sheath 31 or 51, as illustrated in FIG. 5. For example, the two containers 30 and 50 are housed in a single sheath 31, as illustrated in FIG. 6, or sheath 51, as illustrated in FIG. 7.

Figure 4:
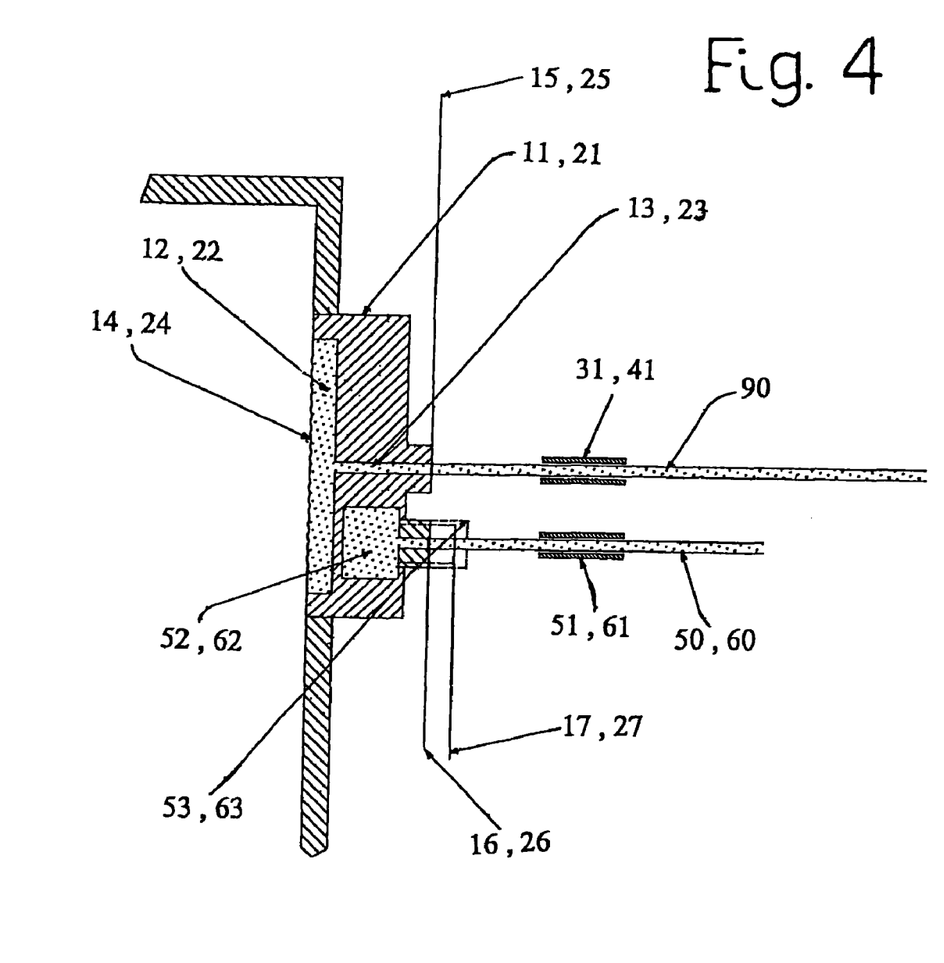
FIG. 4 illustrates enlarged details (not in scale) of the device of FIG. 2 or FIG. 3.

Preferably, the first hydraulic circuit moreover comprises a first chamber 52, which is at least partially made in the first supporting body 11 and is coupled to the first end of the first supplementary container 50. Said first chamber 52 is at least partially made in the first supporting body 11 so as to have one end in a position proximal to, and hydraulically separated from, the third pressure-sensitive element 14, as well as from the two portions 12 and 13. As illustrated by a solid line and not in scale in FIG. 2 or 3 and in particular in FIG. 4, where the separator 10, 20 is represented enlarged, the first chamber 52 is made entirely in the first supporting body 11 and is coupled to the first end of the first supplementary container 50. Alternatively, as illustrated by a dashed line, the first chamber 52 is made in part in the first supporting body 11 and is completed by the end portion of the first supplementary container 50 connected to the first supporting body 11. Provided between the chamber 52 and the first supplementary container 50 is a connection plug 53.

Advantageously, in both of the embodiments, the first chamber 52 delimits an internal volume comprised between 95% and 105% of the internal volume $V_{s1}$ (referred to hereinafter as "first volume $V_{s1}$") of the first cavity 12-13. Said first volume $V_{s1}$, which forms part of the total volume $V_{t1}$, is defined by the inner surface of the third pressure-sensitive element 14 and by the perimetral walls of the first cavity 12-13 up to the interface with the container 30, defined by the demarcation line 15. Said volume $V_{s1}$ is usually a predefined design value. According to a particularly preferred embodiment, the first chamber 52 delimits an internal volume substantially equal to said first volume $V_{s1}$. Said volume is to be understood as defined (in the embodiment represented by a solid line) by the walls of the chamber 52, housed within the body 11 up to the interface with the container 50 delimited by the demarcation line 16, or else (in the embodiment represented by a dashed line) by the walls of the portion of chamber 52, housed in the body 11, plus the volume defined by the end of the container 50 associated thereto up to the demarcation line 17.

The second hydraulic circuit comprises a supplementary container 60 (referred to hereinafter as "second supplementary container"), for example, a flexible tubular body such as a capillary tube. The second supplementary container 60 comprises a first end, operatively connected to the supporting body 21 of the second remote separator 20, on the side opposite to the pressure-sensitive element 24, and a second end, operatively connected to the first pressure-sensitive element 4. As illustrated schematically in FIG. 2 or 3, the end of the supplementary container 60 is connected to the interface flange 7 and is set in operative hydraulic communication with the element 4 via a through channel 8.

Preferably, the second container 40 and the second supplementary container 60 are made of one and the same material, for example, stainless steel type 316l. Also in this case, the two containers 40 and 60 can be housed in two respective sheaths 41 and 61 having the same thickness and being made of the same material, for example, stainless steel of the series 300, with or without outer coating made of PVC; preferably, the two containers 40 and 60 are housed in a single sheath 41 or 61, as illustrated in FIG. 5. For example, the two containers 40 and 60 are housed in a single sheath 41, as illustrated in FIG. 6, or sheath 61, as illustrated in FIG. 7.

Preferably, the second hydraulic circuit moreover comprises a chamber 62 (referred to hereinafter as "second chamber" 62) that is at least partially made in the second supporting body 21 and is coupled to the first end of the second supplementary container 60. In particular, the second chamber is at least partially made in the second supporting body 21 so as to have one end in a position proximal to, and hydraulically separated from, the fourth pressure-sensitive element 24, as likewise from the two portions 22 and 23. As illustrated by a solid line and not in scale in FIG. 2 or 3 and in particular in FIG. 4, where the various elements are represented enlarged, the second chamber 62 is made entirely in the second supporting body 21 and is coupled to the first end of the second supplementary container 60. Alternatively, as illustrated by a dashed line, the second chamber 62 is made in part in the second supporting body 21 and is completed by the end portion 62 of the supplementary container 60 connected to the second supporting body 21. Provided between the chamber 62 and the supplementary container 60 is a connection plug 63.

Advantageously, in both of the embodiments, the second chamber 62 delimits an internal volume comprised between 95% and 105% of the internal volume $V_{s2}$ (referred to hereinafter as "second volume $V_{s2}$") of the second cavity 22-23. Said second volume $V_{s2}$, which is part of the total volume $V_{t2}$, is defined by the inner surface of the fourth pressure-sensitive element 24 and by the perimetral walls of the two portions 22-23 up to the interface with the container 40, defined by the demarcation line 25. Also in this case, the volume $V_{s2}$ is usually a predefined design value, generally equal to the first volume V. According to a particularly preferred embodiment, the second chamber 62 delimits an internal volume substantially equal to the second volume $V_{s2}$. Said volume is to be understood as defined (in the embodiment represented by a solid line) by the walls of the chamber 62 housed within the body 21 up to the interface with the container 60, delimited by the demarcation line 26, or else (in the embodiment represented by a dashed line) by the walls of the portion of chamber 62, housed in the body 21, plus the volume defined by the end of the container 60 associated thereto up to the demarcation line 27.

In practice, the correction means described enable operative coupling of the two detection branches, "discharging" on one another the effects of ambient and/or process temperature, and/or temperature of the instrumentation itself present on a detection branch on the pressure-sensitive element set on the transmitter and belonging to the other branch. In this way, the pressure sensor 3 receives signals previously corrected and balanced between the two parts, thus preventing the need to use electronic any instrumentation that is sophisticated from the structural and corresponding programming standpoint.

It may in practice be noted how the device according to the invention will allow the pre-set task to be performed fully, enabling a significant correction of the errors introduced in the detections on account of thermal effects. Furthermore, the device 100 is obtained according to a structure that is optimised both as a whole and in its individual elements and that can be used in a wide range of industrial plants that comprise a process fluid of which it is desired to carry out detection of one or more physical variables. A further subject of the present invention is consequently constituted by an industrial plant including a process fluid, characterized in that it comprises at least one device 100 for detecting a physical variable for said process fluid according to what has been described previously and is defined in the corresponding claims.

The device 100 thus conceived may undergo numerous modifications and variations, all of which fall within the scope of the inventive idea, provided that said modifications and variations are made in a way compatible with the functions for which they have been envisaged. For instance, a different number of components could be used, e.g., with two first supplementary containers 50 and two supplementary containers 60 instead of one and dividing the respective total internal volume between the two; the shaping of the components could be modified with respect to what has been described in the example of FIGS. 1-2; the principal containers 30 and 40, as well as the supplementary containers 50 and 60 could be otherwise connected and otherwise set in communication with the pressure-sensitive elements 4 and 5. Furthermore, all the details may be replaced by other technically equivalent elements. In practice, the type of materials in the sphere of the applications described above, as well as the dimensions, may be any whatsoever, according to the needs and the state of the art.

The invention claimed is:

1. A device for detecting a physical variable for a process fluid, comprising:
    a pressure transmitter having a main body, provided with a pressure sensor and a first pressure-sensitive element and a second pressure-sensitive element, operatively connected to said pressure sensor,
    a first remote separator, designed to be positioned in a first detection position, and a second remote separator, designed to be positioned in a second detection position;
    a first container having a first end, operatively connected to said first remote separator, and a second end, operatively connected to said first pressure-sensitive element; said first pressure-sensitive element, said first container, and said first remote separator being operatively connected to one another so as to delimit a first closed environment of total volume $V_{t1}$, filled with a substantially incompressible transmission fluid;
    a second container having a first end, connected to said second remote separator, and a second end, operatively connected to said second pressure-sensitive element, said second pressure-sensitive element, second container, and second remote separator being operatively connected to one another so as to delimit a second closed environment of total volume $V_{t2}$, filled with a substantially incompressible transmission fluid; and
    correction means, operatively coupled to said first and second remote separators and to said first and second pressure-sensitive elements, said correction means being arranged outside the main body of said pressure transmitter and being configured so as to exert on said first and second pressure-sensitive elements an action designed to correct at least partially the effect created by differences of temperature existing on or along at least part of said pressure transmitter, first and second remote separators, first and second containers, and surrounding environment,
    wherein said correction means comprise a first closed hydraulic circuit and a second closed hydraulic circuit, separated from one another, and an end surface of which is delimited by said first pressure-sensitive element and by said second pressure-sensitive element, respectively, said first and second closed hydraulic circuits being filled with said substantially incompressible transmission fluid,
    wherein said first closed hydraulic circuit comprises at least one first supplementary container having a first end, operatively connected to said first remote separator, and a second end, operatively connected to said second pressure-sensitive element, the second end of the first container and the second end of the first supplementary container being operatively connected to a same first interface flange or wall of the body of said pressure transmitter, and
    wherein said second hydraulic circuit comprises a second supplementary container having a first end, operatively connected to said second remote separator, and a second end, operatively connected to said first pressure-sensitive element, the second end of the second container and the second end of the second supplementary container being operatively connected to a same second interface flange or wall of the body of said pressure transmitter.

2. The device according to claim 1, wherein said first closed hydraulic circuit delimits an internal volume comprised between 95% and 105% of said total volume $V_{t1}$.

3. The device according to claim 2, wherein said first closed hydraulic circuit delimits an internal volume substantially equal to said total volume $V_{t1}$.

4. The device according to claim 1, wherein said second closed hydraulic circuit delimits an internal volume comprised between 95% and 105% of said total volume $V_{t2}$.

5. The device according to claim 4, wherein said second closed hydraulic circuit delimits an internal volume substantially equal to said total volume $V_{t2}$.

6. The device according to claim 1, wherein said first remote separator comprises a first supporting body, provided with at least one first cavity, and a third pressure-sensitive element, fixed on said first supporting body so as to have an outer surface, designed to interface with said process fluid in said first detection position, and an inner surface that gives out onto said at least one first cavity, said first hydraulic circuit comprises a first chamber at least partially made in said first supporting body and operatively coupled to said first end of the first supplementary container.

7. The device according to claim 6, wherein said first chamber is at least partially made in said first supporting body in a position proximal to, and hydraulically separated from, said third pressure-sensitive element.

8. The device according to claim 7, wherein said first chamber is made entirely in said first supporting body and is connected to said first end of the first supplementary container.

9. The device according to claim 7, wherein said first chamber is made partially in said first supporting body and comprises an additional portion constituted by an end portion of the first supplementary container set outside and connected to said first supporting body.

10. The device according to claim 6, wherein said first chamber delimits an internal volume comprised between 95% and 105% of the internal volume of the at least one first cavity.

11. The device according to claim 10, wherein said first supplementary chamber delimits an internal volume substantially equal to said internal volume of the at least one first cavity.

12. The device according to claim 1, wherein said second remote separator comprises a second supporting body, provided with at least one second cavity, and a fourth pressure-sensitive element, fixed on said second supporting body so as to have an outer surface designed to interface with said process fluid in said second detection position, and an inner surface that gives out onto said second cavity, said second hydraulic circuit comprises a second chamber at least partially made in said second supporting body and operatively coupled to said first end of the second supplementary container.

13. The device according to claim 12, wherein said second chamber is at least partially made in said second body in a position proximal to, and hydraulically separated from, said fourth pressure-sensitive element.

14. The device according claim 12, wherein said second chamber is made entirely in said first supporting body and is connected to said first end of the second supplementary container.

15. The device according to claim 13, wherein said first chamber is made partially in said first supporting body and comprises an additional portion, constituted by an end portion of the second supplementary container set outside and connected to said second supporting body.

16. The device according to claim 12, wherein said second chamber delimits an internal volume comprised between 95% and 105% of the internal volume of said second cavity.

17. The device according to claim 16, wherein said second chamber delimits an internal volume substantially equal to the internal volume of the second cavity.

18. The device according to claim 1, wherein said first container, second container, first supplementary container and second supplementary container are made of one and the same material.

19. The device according to claim 1, wherein said first container and first supplementary container are housed in two respective sheaths having the same thickness and being made of the same material.

20. The device according to claim 1, wherein said first container and first supplementary container are housed in one and the same sheath.

21. The device according to claim 1, wherein said second container and said second supplementary container are housed in two respective sheaths having the same thickness and being made of the same material.

22. The device according to claim 1, wherein said second container and said second supplementary container are housed in one and the same sheath.

23. An industrial plant comprises a process fluid, wherein it comprises at least one device for detecting a physical variable of said process according to claim 1.

* * * * *